Figure 1:
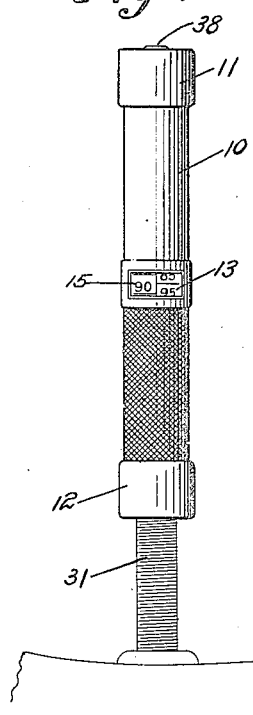

F. VINCENT.
PRESSURE GAGE.
APPLICATION FILED AUG. 8, 1917.

1,263,165.

Patented Apr. 16, 1918.

WITNESS
Chester F. Hayden.

INVENTOR
Franz Vincent
BY
A. M. Wooster
ATTORNEY

UNITED STATES PATENT OFFICE.

FRANZ VINCENT, OF BRIDGEPORT, CONNECTICUT.

PRESSURE-GAGE.

1,263,165.	Specification of Letters Patent.	Patented Apr. 16, 1918.

Application filed August 8, 1917. Serial No. 184,992.

*To all whom it may concern:*

Be it known that I, FRANZ VINCENT, a citizen of the United States, residing at Bridgeport, county of Fairfield, State of Connecticut, have invented an Improvement in Pressure-Gages, of which the following is a specification.

The objects of this invention are to provide a pressure gage adapted for general use and especially adapted for determining the air pressure in pneumatic tires, which shall be relatively inexpensive to produce, efficient, accurate and practically noiseless in use, in which the passage of air from a tire to the gage is controlled in such a manner as to prevent its entering the gage too quickly and in too large a quantity, thus preventing undue loss of air, which will operate equally well if the stem of the tire valve happens to be slightly longer or shorter than the normal length, and in which the indicator shall be wholly retained within the case at all times and shall be automatically retained in indicating position after the gage is removed from the tire.

With these and other objects in view, I have devised the novel pressure gage, which I will now describe referring to the accompanying drawing forming a part of this specification and using reference characters to indicate the several parts.

Figure 2:
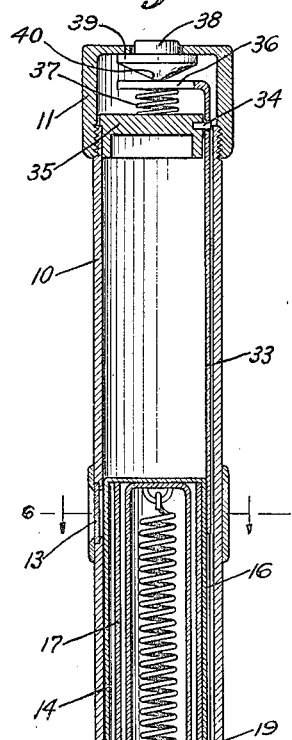
Figure 3:
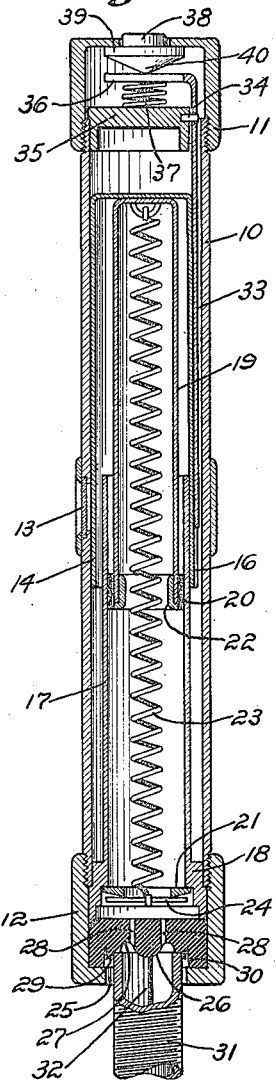
Figure 4:
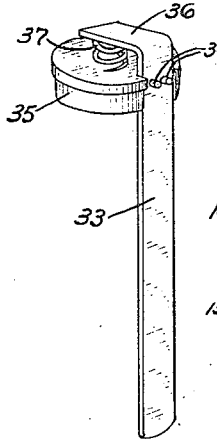
Figure 5:
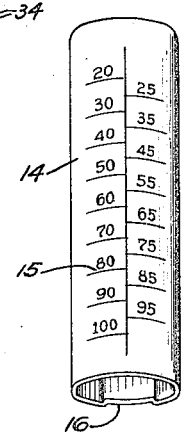
Figure 6:
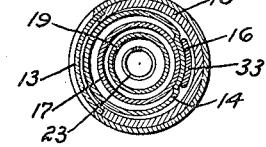
Figure 7:
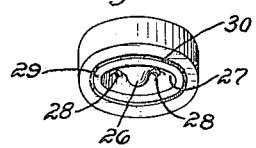

Figure 1 is an elevation illustrating the use of my novel pressure gage;

Fig. 2 a longitudinal section on an enlarged scale, the parts being in the normal position;

Fig. 3 a similar view showing the gage applied to the tube of a tire valve, the cap being removed and the tube partly broken away to show the valve stem and the coöperation therewith of my novel resilient plug block and unseating stud;

Fig. 4 a perspective view of the indicator brake detached;

Fig. 5 a perspective view of the indicator detached;

Fig. 6 a transverse section on the line 6—6 in Fig. 2 looking in the direction of the arrows, and Fig. 7 is a perspective view of the plug block and unseating stud, detached.

10 denotes the casing which is tubular, is provided at its upper end with a head cap 11, at its lower end with a base cap 12 and intermediate the caps with a window 13. Sliding within the casing is a tubular indicator 14 closed at its upper end, open at its lower end and provided with a scale 15, graduated to coöperate with the window in indicating air pressure, and with a longitudinal groove 16 which receives the brake strip as will be more fully described. Within the indicator is a guide tube 17 which is open at its upper end and is provided at its lower end with a head 18 which fits closely within the base cap and is shouldered externally to receive the end of the casing and internally to receive a washer 21. Within the guide tube is a pneumatic plunger 19 which is provided exteriorly with a packing ring 20 to make an air tight sliding connection between the guide tube and the plunger. The lower end of the plunger is strengthened by means of a thimble 22 which also serves as a support for the lower end of a spring 23, the normal action of which is to retain the plunger in its normal position as in Fig. 2. One end of the spring is attached to the closed end of the plunger and the other end to washer 21, the washer being provided with a central hole through which the spring passes, and the spring being shown as secured to the washer by means of a pin 24.

The base cap is provided with a hole 25 large enough to receive the tube of a tire valve. Seated between the end of the base cap and head 18 of the guide tube is a resilient member comprising a plug block and unseating stud formed integral of resilient material, as rubber, the special construction of which is an important feature of the present invention. This resilient member comprises essentially a central unseating stud 26 surrounded by a groove 27, one or more air ducts leading from the base of the groove through the block, a circular rib 29 surrounding the groove and higher than the unseating stud and another relatively narrow and deep groove 30 surrounding the rib, the purpose of which is to insure ample flexibility to the rib, compare Figs. 2 and 3.

The operation of the portion of the invention already described, is as follows. The gage is applied to the tube of a tire valve, indicated by 31, as shown in Figs. 1 and 3. The edge of the tube engages the rib and compresses it inward and laterally as indicated in Fig. 3. In practice the distance between groove 30 and the ducts is amply sufficient to provide for both the largest and the smallest valve tubes in general use. Whether the valve tube is relatively large or small the rib will be compressed as indicated in Fig. 3 and will effect a perfectly tight joint between the tube and the gage before the valve stem, indicated by 32, will be engaged by the unseating stud. The rib is in practice made amply resilient to effect a tight joint with the valve tube even if the valve stem is more than ordinarily long, and on the other hand if the valve stem is shorter than the normal, the rib will simply be compressed a little more before the valve stem will be engaged by the unseating stud. The operator simply presses the gage down upon the end of the valve tube until the valve is unseated by the engagement of the stud with the stem and air is permitted to pass from the tube to the gage. The ducts, two being shown in the present instance, are so proportioned that passage of air from the tube to the gage while perfectly free, is not made with a great rush the instant the valve is unseated. In other words, while the full pressure of air in the tire passes to the gage it passes with only moderate velocity and owing to the fact that the ducts are formed in resilient material, the operation of the gage is practically noiseless and furthermore the indication of the pressure is more accurate owing to the fact that the indicator is moved a trifle more slowly. The effect of the passage of air into the gage is to raise the plunger against the tension of the spring, the plunger in turn raising the indicator, which moves freely in the casing. The scale upon the indicator, in coöperation with the lower edge of the window in the casing, will now correctly indicate the pressure within the tire.

As a means of retaining the indicator in indicating position, I provide a brake strip 33 which lies in groove 16 in the indicator and has its fulcrum on pins 34 extending from a plug 35 in the upper end of the casing, the plug being cut away to receive the brake strip as shown in Fig. 4. At the upper end of the brake strip is an angle arm 36 and lying between the angle arm and the outer face of the plug is a spring 37, the normal action of which is to raise the angle arm and force the brake strip against the indicator to retain it in any position in which it may be placed. 38 denotes a push button seated in a central hole in the head cap and having a flange 39 engaging the inner side of the cap and a stud 40 engaging the angle arm.

Spring 37 is strong enough to hold the brake strip against the indicator with sufficient pressure to retain it in place, but it is not strong enough to interfere appreciably with the raising of the indicator by the plunger and this slight pressure may be released at any time by means of the push button. Suppose for example, that the indicator has been raised by the plunger as shown in Fig. 3, the instant the operator removes the gage from the valve tube spring 23 will return the plunger to its normal position, as in Fig. 2, but will leave the indicator in the position shown in Fig. 3, in which position it is retained by the brake strip. As soon as the pressure reading has been made the operator by a slight pressure on the push button relieves the action of the brake strip on the indicator which will instantly drop by gravity to its normal position as in Fig. 2.

Having thus described my invention, I claim:—

1. A pressure gage comprising a casing having a window, an indicator having a scale adapted to coöperate with the window, a spring controlled pneumatic plunger adapted to raise the indicator, and a resilient member in the base of the casing comprising a circular rib adapted to be engaged by a valve tube, a central valve unseating stud, and an air duct at the base of the stud through which air may enter the plunger.

2. A pressure gage comprising a casing having a window, an indicator having a scale adapted to coöperate with the window, a spring controlled pneumatic plunger adapted to raise the indicator, and a resilient member in the base of the casing, said resilient member being formed on its outer face with a laterally resilient circular rib adapted to be engaged by a valve tube and with a central valve unseating stud, said resilient member having an air duct therethrough having its exterior opening at the base of said stud.

3. A pressure gage comprising a casing having a window, an indicator having a scale adapted to coöperate with the window, a spring controlled pneumatic plunger adapted to raise the indicator, and a resilient member in the base of the casing comprising a circular rib adapted to be engaged by a valve tube, a central valve unseating stud, an air duct at the base of the stud through which air may enter the plunger, and means for retaining the indicator in indicating position independently of the plunger.

4. In a pressure gage, a resilient member comprising a circular rib adapted to be engaged by a tire valve tube, a central unseating stud adapted to engage a tire valve stem, and an air duct at the base of the stud, for the purpose set forth.

5. In a pressure gage, a resilient member comprising a central unseating stud, an air duct at the base of the stud, a circular rib adapted to be engaged by a tire valve tube, and circular grooves on opposite sides of the rib.

6. In a pressure gage, a resilient coupling and air controlling member formed on its outer face with a central unseating stud adapted to engage a tire valve stem and with a circular rib surrounding said stud and spaced therefrom, said rib being adapted to be engaged by a tire valve tube, and said resilient member having an air duct therethrough having its exterior opening at the base of said stud and between the same and said rib.

7. In a pressure gage, a resilient coupling and air controlling member formed on its outer face with a central unseating stud adapted to engage a tire valve stem and with a laterally flexible circular rib adapted to be engaged by a tire valve tube, said resilient member having an air duct therethrough having its exterior opening at the base of said stud.

8. A pressure gage, comprising a casing having a window, an indicator having a scale adapted to be read at the window, and a longitudinal groove, a spring controlled plunger adapted to be raised by air pressure and to raise the indicator, and a spring controlled brake strip in the groove, whereby the indicator is retained in the raised position after retraction of the plunger.

9. A pressure gage, comprising a casing having a window, an indicator having a scale adapted to be read at the window and a longitudinal groove, a spring controlled plunger adapted to be raised by air pressure and to raise the indicator, a brake strip lying in the groove and having an angle arm, a spring acting on the angle arm to retain the brake in engagement with the indicator, and a push button adapted to relieve the action of the brake and permit the indicator to drop by gravity.

10. A pressure gage, comprising a casing having a window, and head and base caps at its ends, a guide tube having a head, seated in the base cap, an indicator having a scale adapted to be read at the window and a closed upper end normally engaging the guide tube, and a spring controlled plunger within the guide tube, closed at its upper end and having a packing ring engaging the guide tube, said plunger acting to raise the indicator when air is admitted.

11. A pressure gage comprising a casing having a window, an indicator having a scale adapted to be read at the window, a spring controlled penumatic plunger adapted to raise the indicator, a brake for retaining the indicator in the raised position and means for relieving the brake action permitting the indicator to drop by gravity.

12. A pressure gage, comprising a casing having a window, an indicator having a scale adapted to be read at the window, a spring controlled plunger, and a resilient member in the base of the casing comprising a circular rib adapted to be engaged by a valve tube, a central valve unseating stud, and an air duct at the base of the stud through which air may enter the plunger to raise the indicator.

13. A pressure gage, comprising a casing having a window, an indicator having a scale adapted to be read at the window, a spring controlled plunger, a resilient member in the base of the casing comprising a circular rib adapted to be engaged by a valve tube, a central valve unseating stud, and an air duct at the base of the stud through which air may enter the plunger to raise the indicator, means for retaining the indicator raised, and means for releasing the indicator permitting it to drop by gravity.

14. A pressure gage, comprising a casing having a window, an indicator having a scale adapted to be read at the window, a spring controlled plunger, a resilient member in the base of the casing comprising a circular rib adapted to be engaged by a valve tube, a central valve unseating stud, an air duct at the base of the stud through which air may enter the plunger to raise the indicator, a spring controlled brake acting on the indicator to retain it raised, and a push button for releasing the brake and permitting the indicator to drop by gravity.

In testimony whereof I affix my signature.

FRANZ VINCENT.